Figure 1:
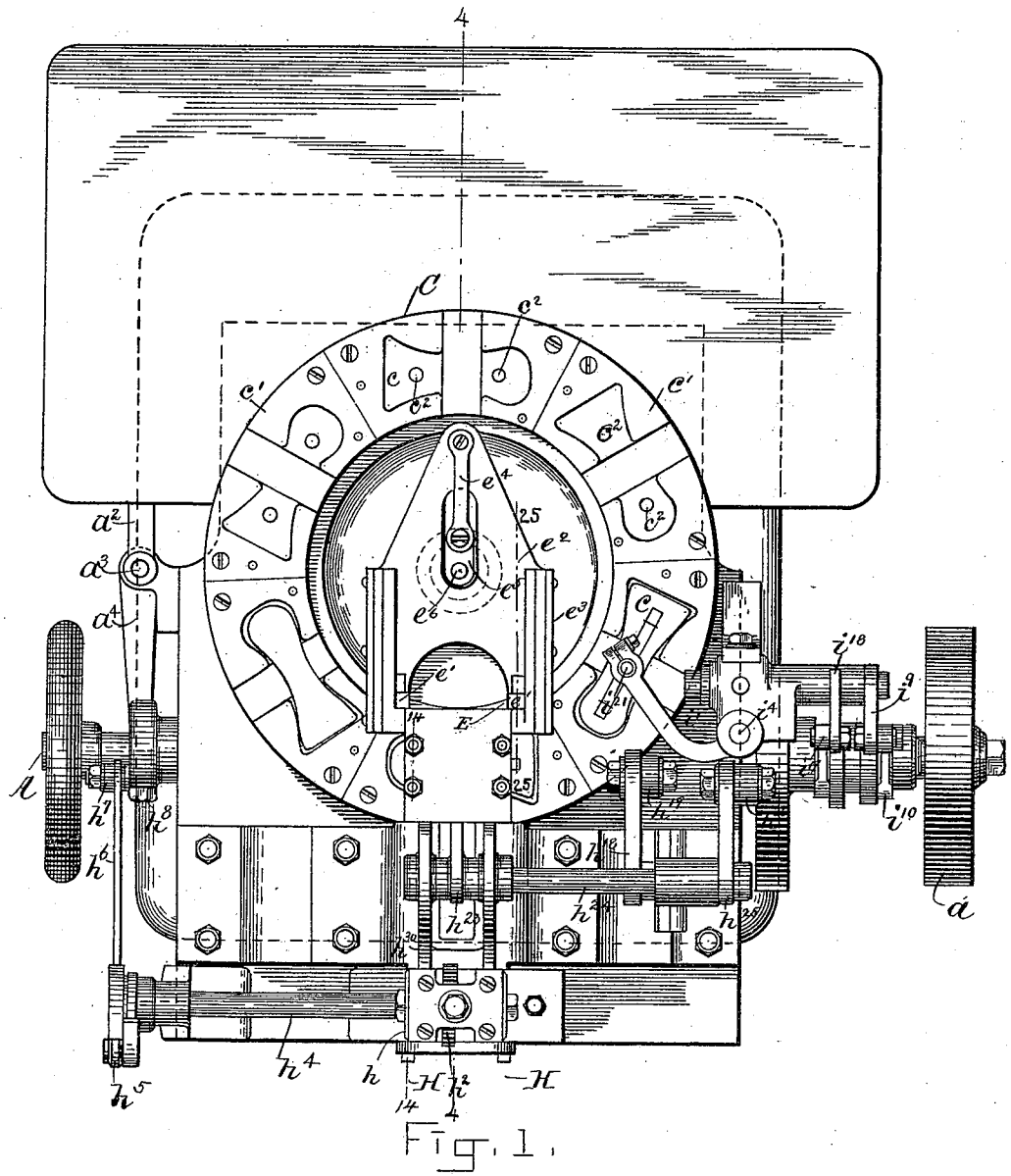

(No Model.) 15 Sheets—Sheet 1.
A. C. CAMPBELL.
MACHINE FOR MANUFACTURING SHOE SHANKS.

No. 554,652. Patented Feb. 18, 1896.

WITNESSES. INVENTOR.

(No Model.) 15 Sheets—Sheet 4.

A. C. CAMPBELL.
MACHINE FOR MANUFACTURING SHOE SHANKS.

No. 554,652. Patented Feb. 18, 1896.

WITNESSES. INVENTOR.

(No Model.)   15 Sheets—Sheet 6.
A. C. CAMPBELL.
MACHINE FOR MANUFACTURING SHOE SHANKS.
No. 554,652.   Patented Feb. 18, 1896.
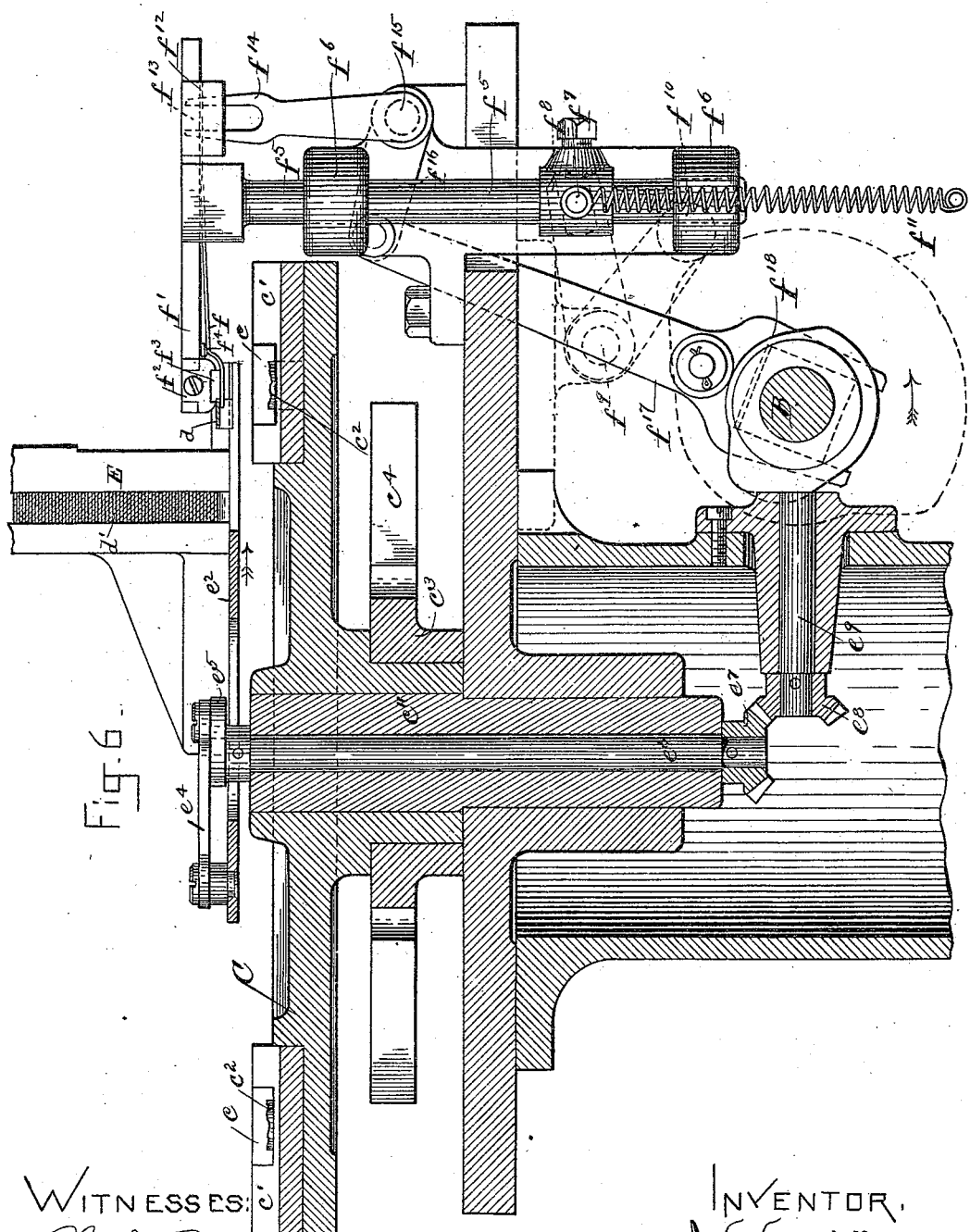
WITNESSES:   INVENTOR, (No Model.) 15 Sheets—Sheet 7.
A. C. CAMPBELL.
MACHINE FOR MANUFACTURING SHOE SHANKS.
No. 554,652. Patented Feb. 18, 1896.
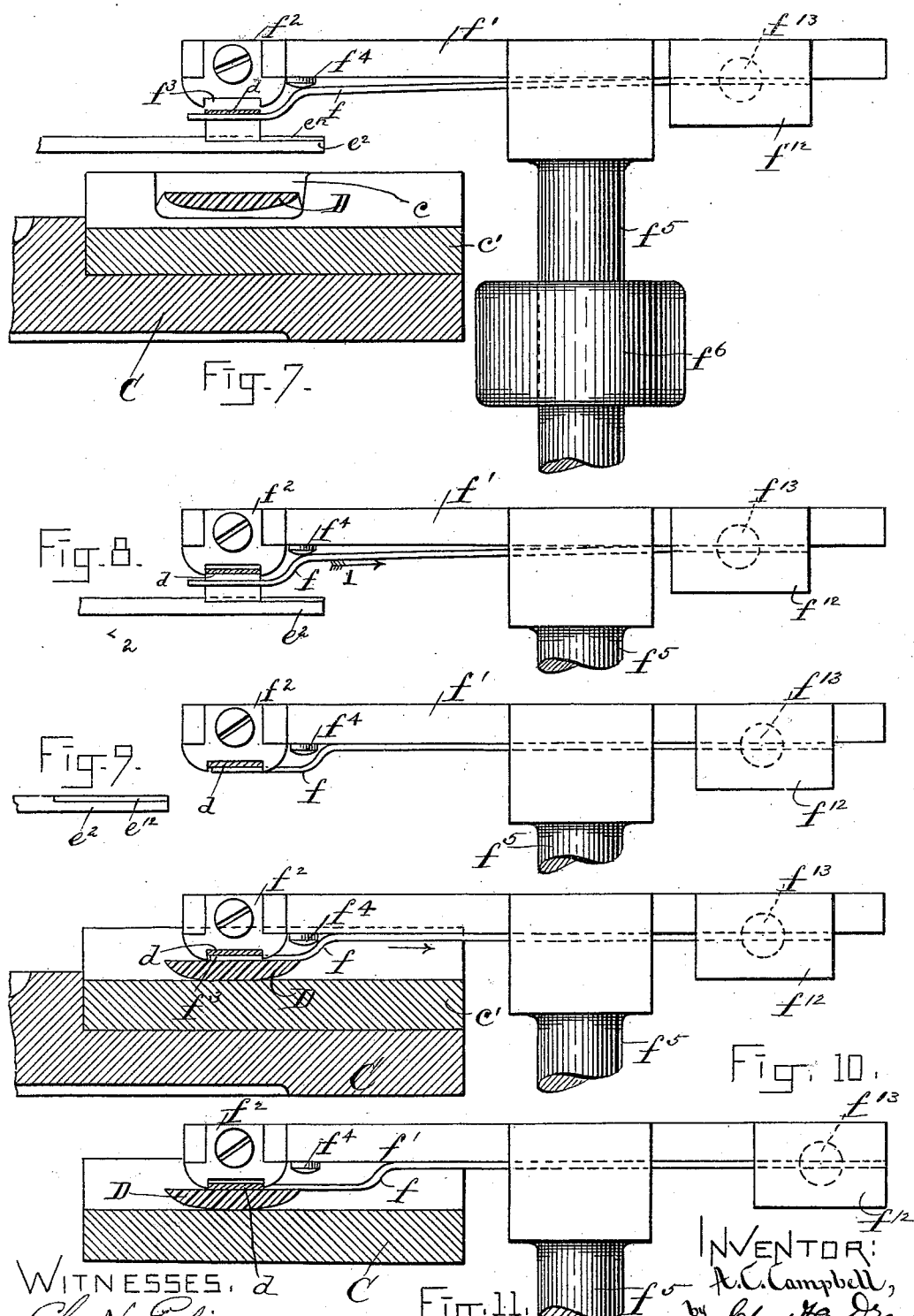

(No Model.)  15 Sheets—Sheet 8.

A. C. CAMPBELL.
MACHINE FOR MANUFACTURING SHOE SHANKS.

No. 554,652.  Patented Feb. 18, 1896.

Witnesses,
Chas. V. Gooding
Mina H. Kelley

Inventor,
A. C. Campbell,
by Cena H. Drew
his Attorney.

(No Model.) 15 Sheets—Sheet 11.

A. C. CAMPBELL.
MACHINE FOR MANUFACTURING SHOE SHANKS.

No. 554,652. Patented Feb. 18, 1896.

WITNESSES:
Chas. S. Gooding.
Minor H. Billey.

INVENTOR:
A. C. Campbell
by Lewis Hed nev
his Attorney.

ANDREW B. GRAHAM, PHOTO-LITHO. WASHINGTON, D.C.

(No Model.) 15 Sheets—Sheet 12.

A. C. CAMPBELL.
MACHINE FOR MANUFACTURING SHOE SHANKS.

No. 554,652. Patented Feb. 18, 1896.

WITNESSES.
Chas. V. Gooding
Mina H. Kelley

INVENTOR.
A. C. Campbell,
by Chas. H. Drew
his Attorney.

(No Model.) 15 Sheets—Sheet 14.
A. C. CAMPBELL.
MACHINE FOR MANUFACTURING SHOE SHANKS.

No. 554,652. Patented Feb. 18, 1896.

WITNESES.
Chas. V. Gooding.
Mina H. Kelley.

INVENTOR:
A. C. Campbell,
by Chas. Hedred
his Attorney.

(No Model.) 15 Sheets—Sheet 15.
A. C. CAMPBELL.
MACHINE FOR MANUFACTURING SHOE SHANKS.
No. 554,652. Patented Feb. 18, 1896.
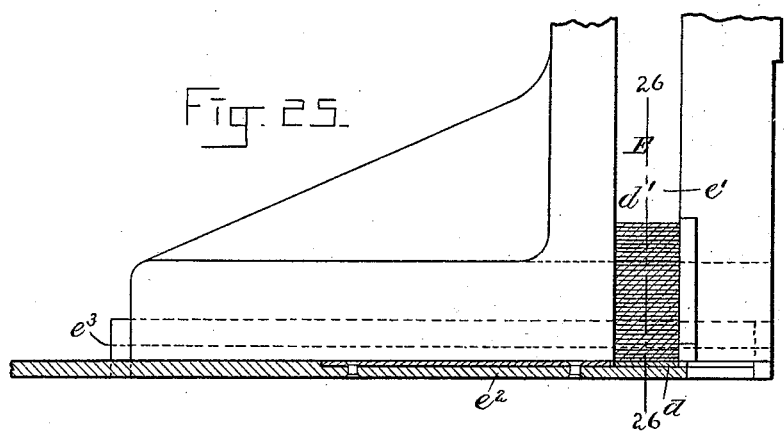
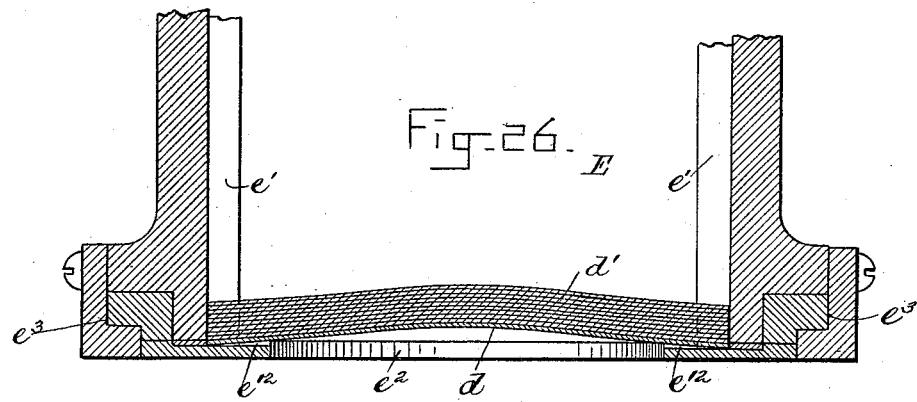
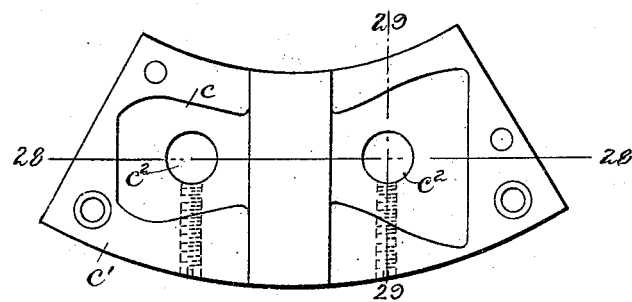
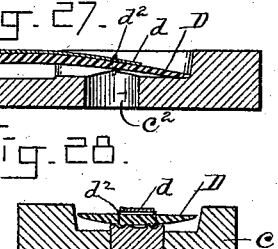
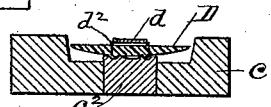
WITNESSES: INVENTOR.
Chas. N. Gooding. A. C. Campbell,
Wm. H. Kelley. by _____
his Attorney.

UNITED STATES PATENT OFFICE.

ANDREW C. CAMPBELL, OF WATERBURY, CONNECTICUT, ASSIGNOR TO HIRAM H. JENKINS AND GEORGE O. JENKINS, OF WHITMAN, MASSACHUSETTS.

MACHINE FOR MANUFACTURING SHOE-SHANKS.

SPECIFICATION forming part of Letters Patent No. 554,652, dated February 18, 1896.

Application filed April 15, 1895. Serial No. 545,839. (No model.)

*To all whom it may concern:*

Be it known that I, ANDREW C. CAMPBELL, of Waterbury, in the county of New Haven and State of Connecticut, have invented certain new and useful Improvements in Machines for the Manufacture of Shoe-Shanks, of which the following is a specification.

My invention relates particularly to shoe-shanks made from leather or leather-board; and it consists of devices for attaching a reinforcing of stiffening piece, either of metal or any other suitable material, to one side, preferably the upper, or that which comes next the inner sole of the shank, the object of this reinforcing-piece being to impart additional firmness or stiffness to the shank-piece, which is especially desirable in the case of shoe-shanks made of leather or leather-board. Heretofore it has been usual to use for the purpose stated a thin strip of steel, having in each of its ends a hole, which strip is attached to the shoe-shank by suitable fastenings passing through these holes. The process of attaching these reinforcing-pieces to the shoe-shanks is somewhat slow and the necessity of drilling the holes in the reinforcing-pieces adds somewhat to the cost of producing the shanks. The principal objection to this mode of attaching the reinforcing-pieces to the shoe-shanks, however, is the fact that the piece, being rigidly attached to the shoe-shank, tends to tear it, especially when it is constructed of leather-board or similar material.

George O. Jenkins, of Whitman, Massachusetts, has devised a shoe-shank of novel construction, consisting of a piece of leather-board, leather, or other suitable material of the proper shape for a shoe-shank, having a reinforcing or stiffening piece, preferably of thin steel, attached to it by means of a staple-shaped metallic fastening, preferably astride of the reinforcing-piece, but it may be found desirable at times to drive it through the stiffening-piece when it is not metal, and having its ends clinched or turned over, so as to securely hold together the shank and its reinforcing-piece.

My invention relates to a machine organized for the purpose of producing the aforesaid reinforced shoe-shank. In this machine I design to use pieces of leather, leather-board or other suitable material, forming the main part of the shoe-shank, which pieces have been previously cut into proper shape and are to be fed to the machine by the hand of the operator, and reinforcing-pieces, preferably of steel, but which may be of other suitable material, as above stated, and when of steel are slightly curved, as shown in Figures 26 and 27 of the drawings, which pieces have been previously prepared.

My invention consists essentially of four parts, all co-operating to produce the aforesaid new article of manufacture—namely, first, a rotating disk provided with receptacles around its periphery, adapted for the reception of the pieces of leather-board or other material which is to form the main portion of the shoe-shank; second, a suitable receptacle or hopper in which the reinforcing-pieces are to be placed, and from which they are to be removed from beneath by a suitable device, which delivers them to a holder or clasping device, by which each reinforcing-piece is successively taken and carried upon the shank-piece to which it is to be attached and held in proper position there until it is fastened, when the holding device recedes; third, a device by means of which staple-shaped fastenings are formed from wire fed into the machine and are driven, one near each end and astride of the reinforcing-pieces, simultaneously, the ends of the fastenings passing through the shank-pieces and against a concavity in a metallic plate beneath, by means of which these ends are turned over, so as to form a clinch, and, fourth, a device for removing the finished shank from the machine.

Figure 2:
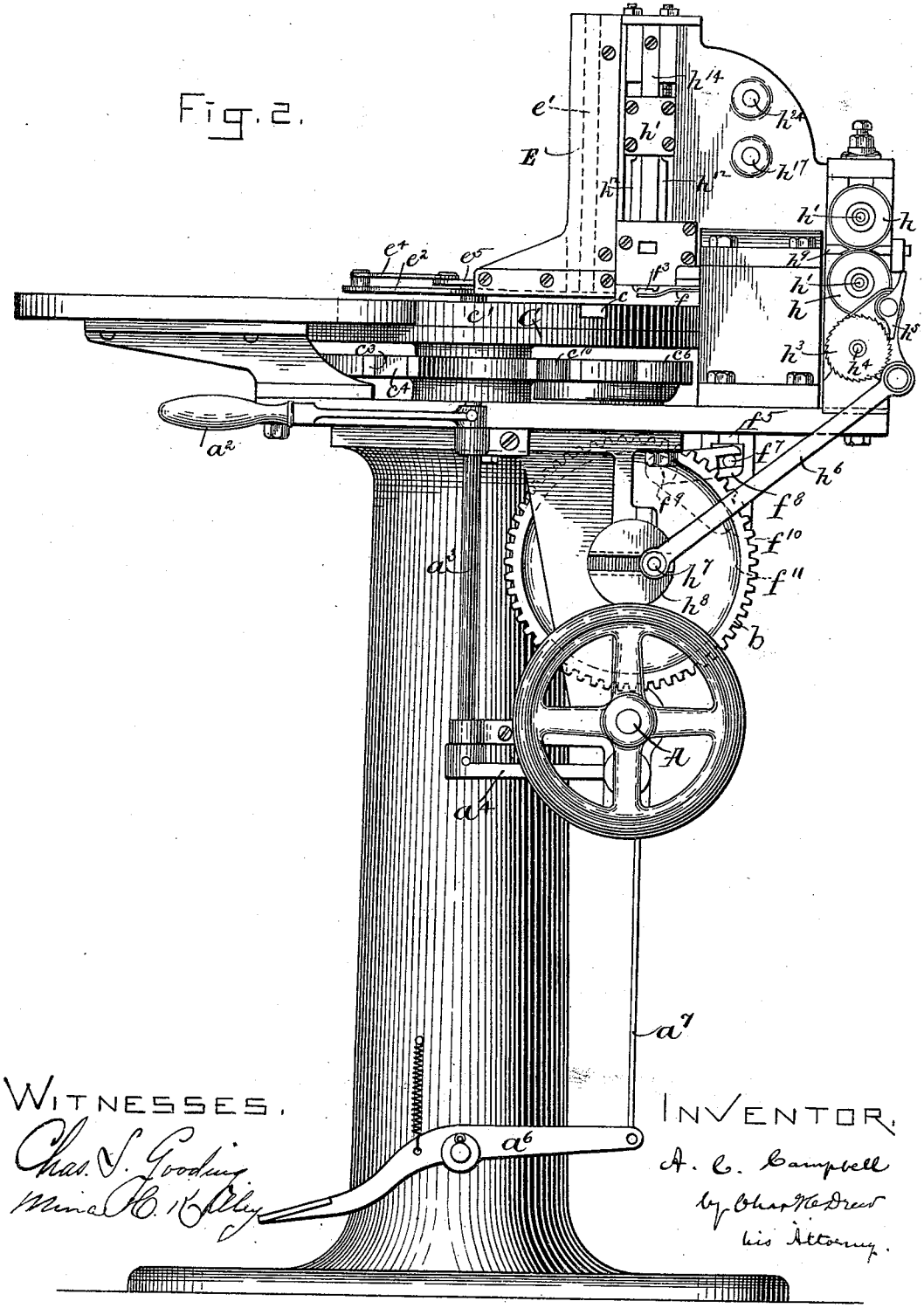
Figure 3:
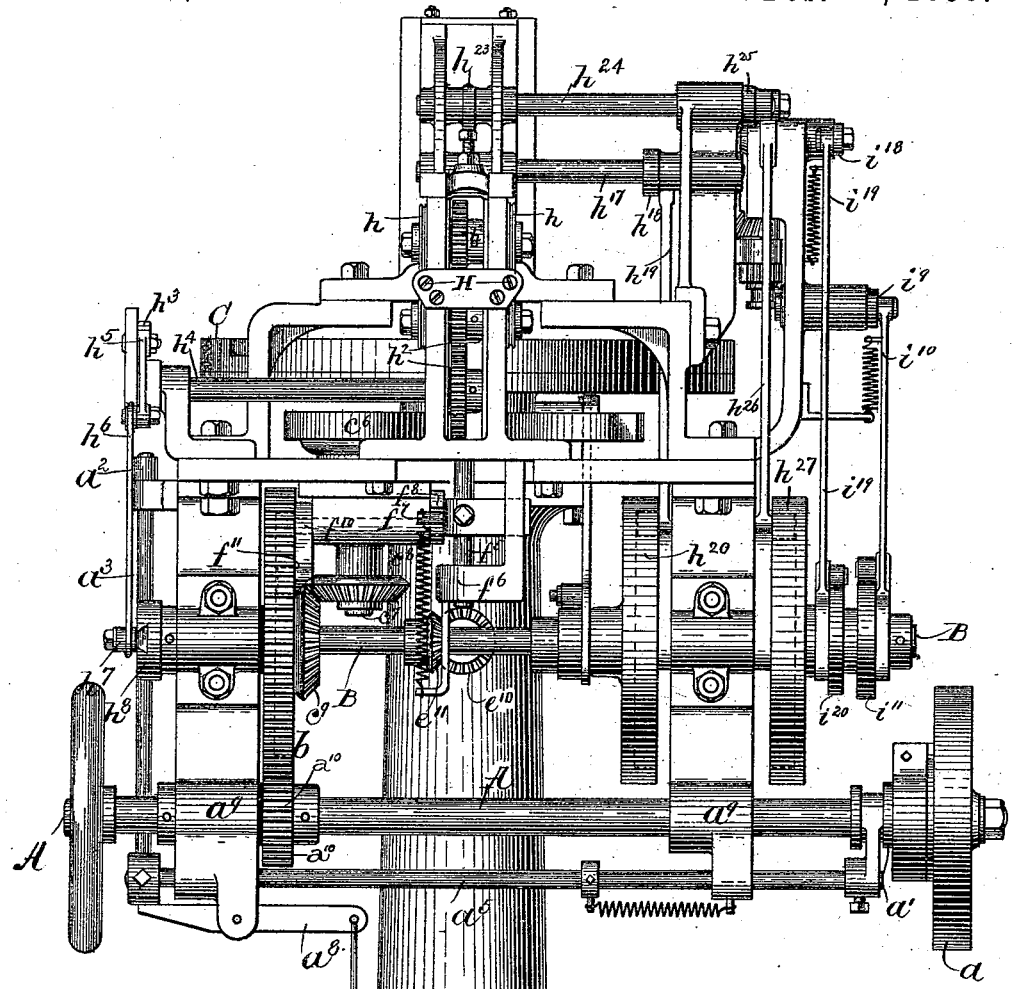
Figure 4:
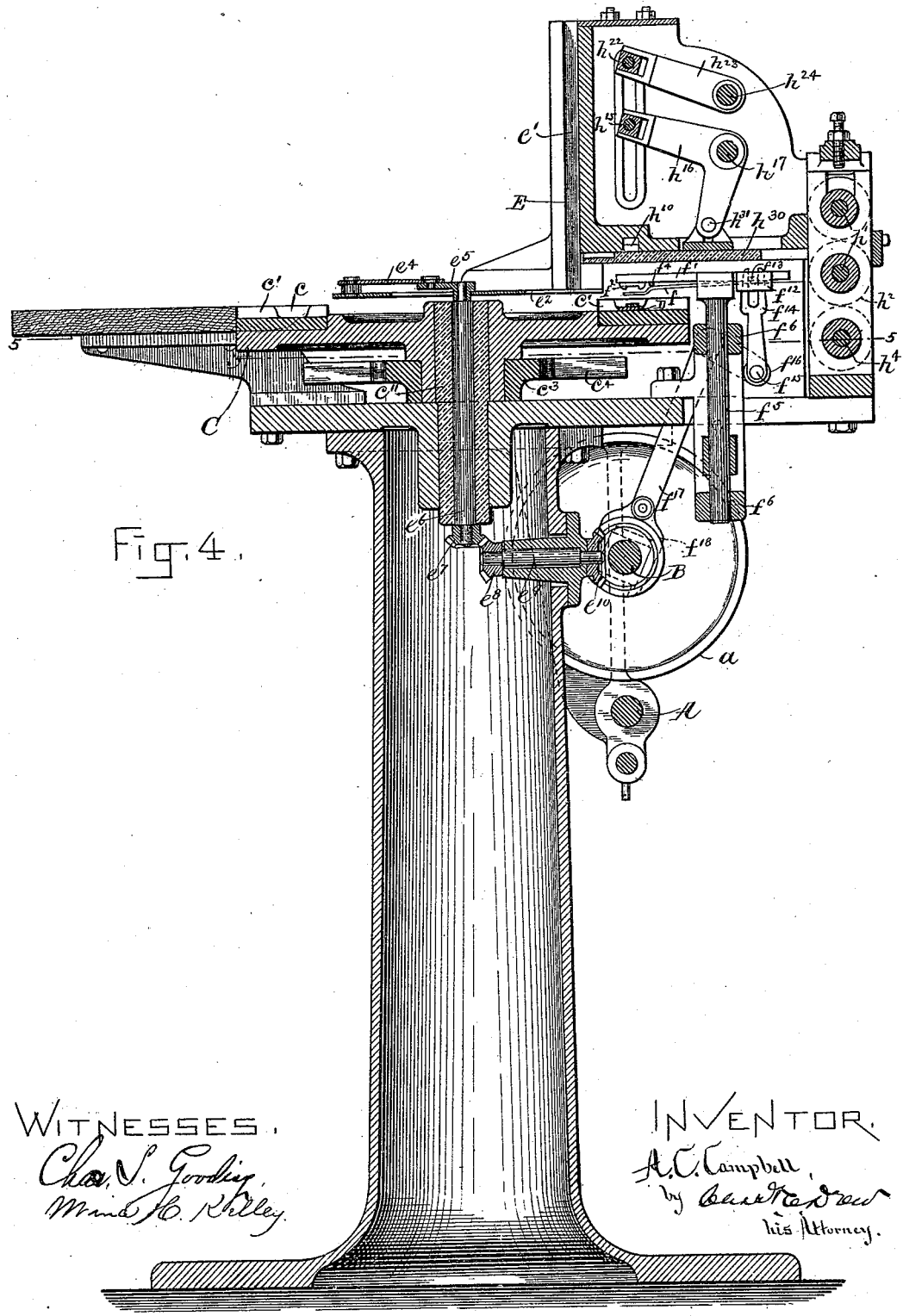
Figure 5:
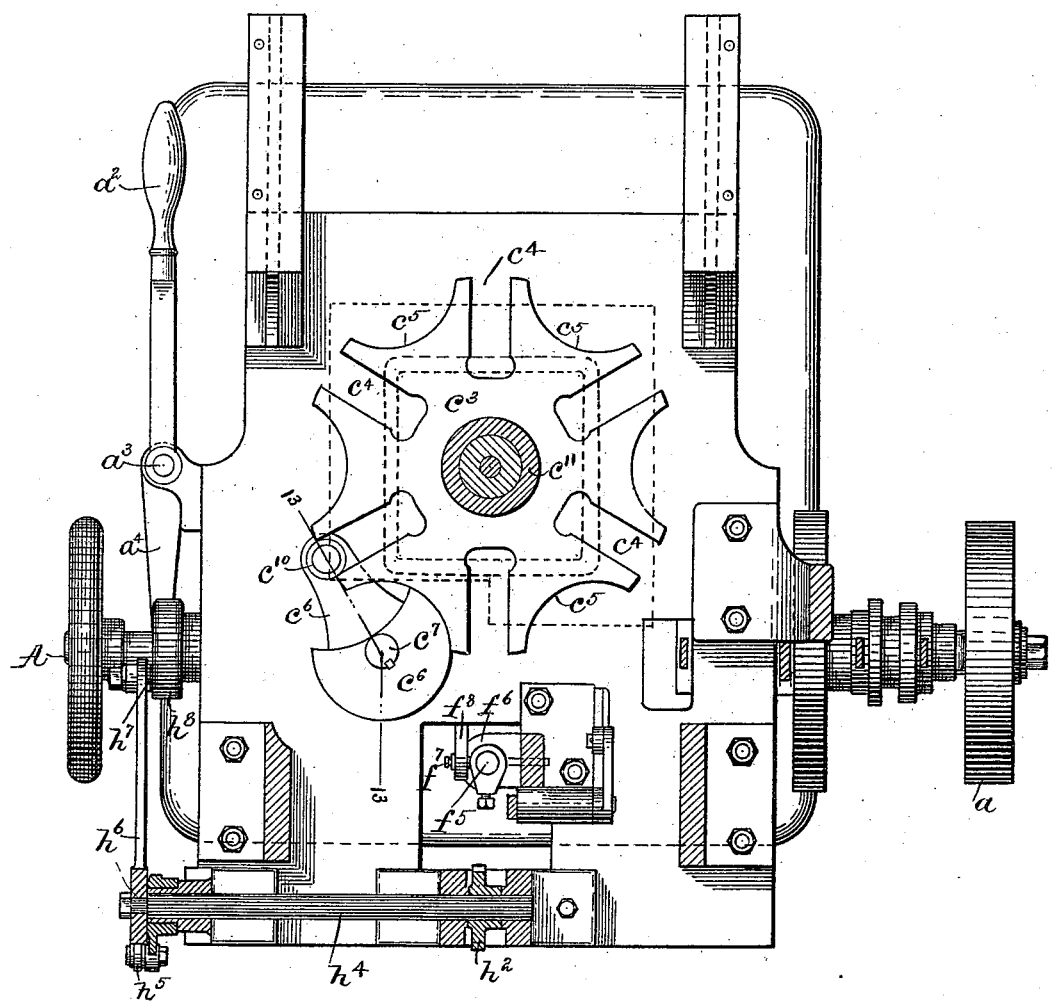
Figure 12:
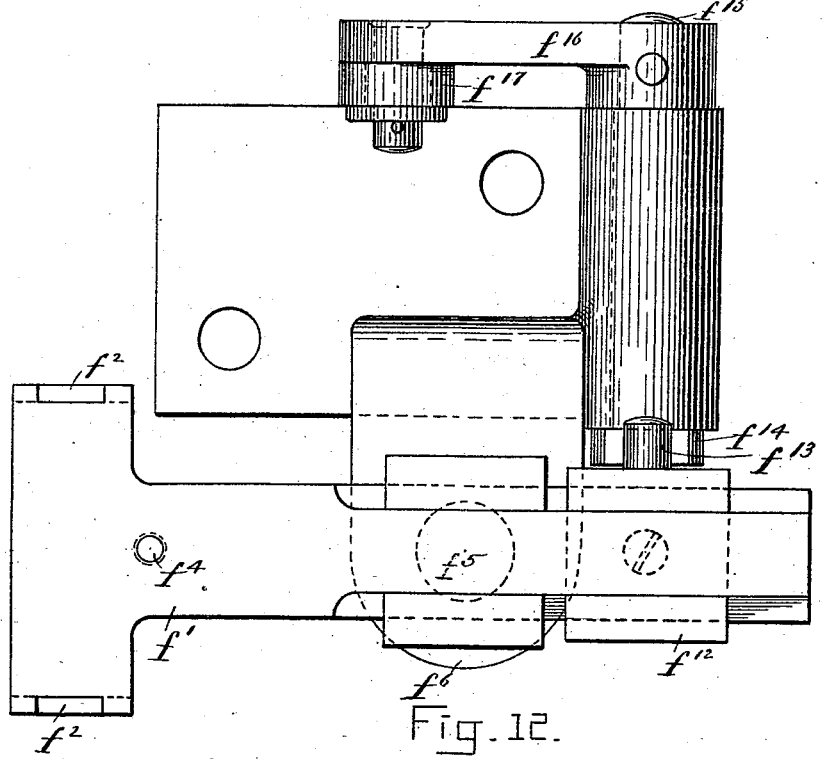
Figure 13:
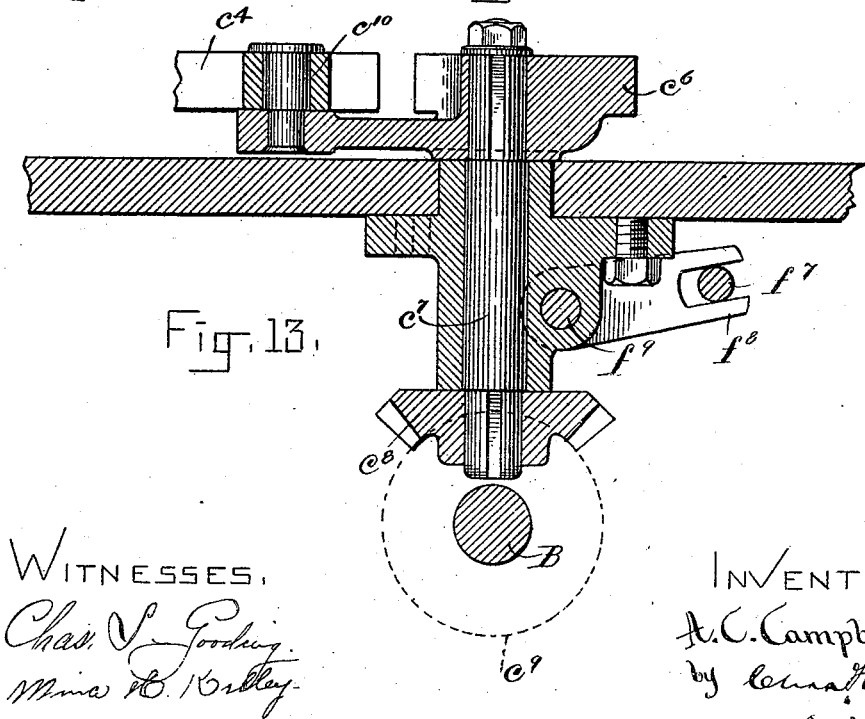
Figure 14:
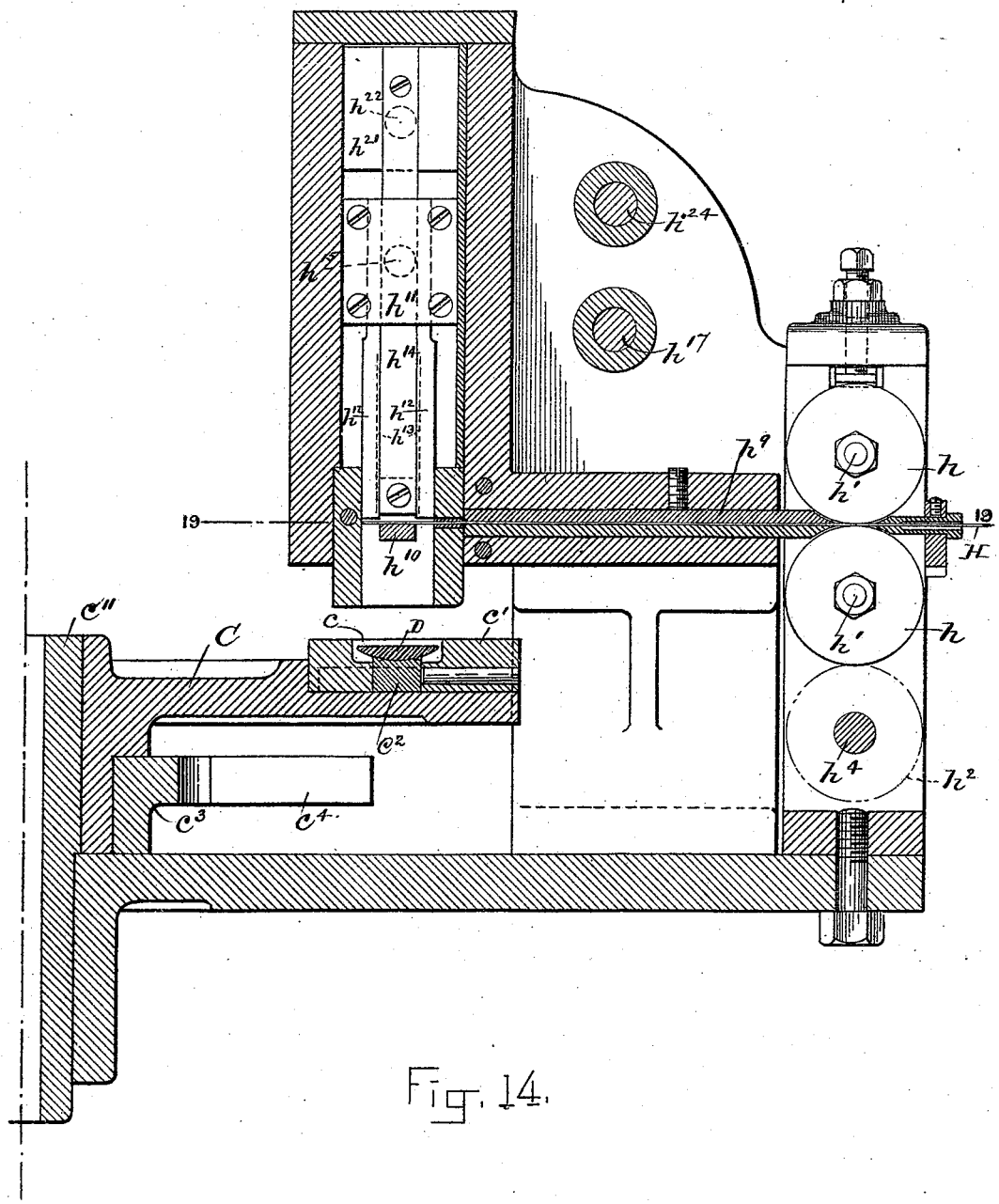
Figure 15:
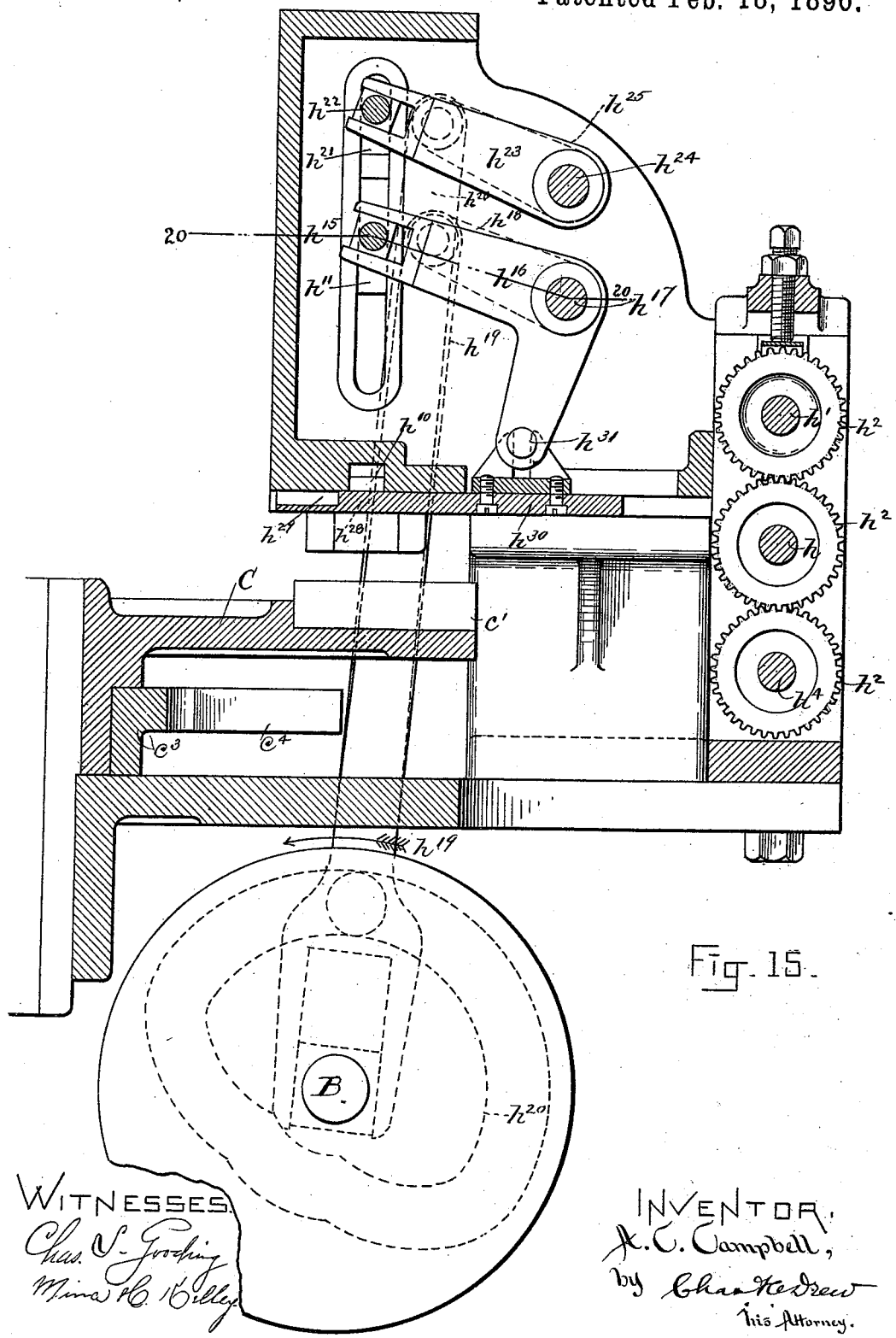
Figure 16:
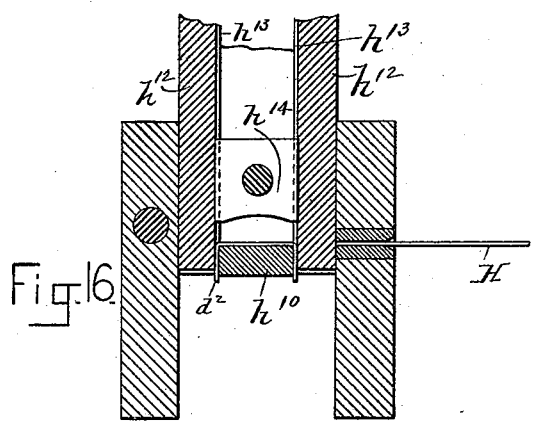
Figure 17:
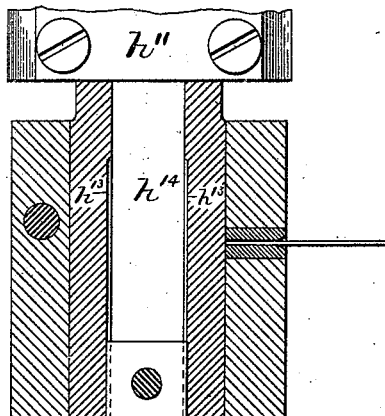
Figure 18:
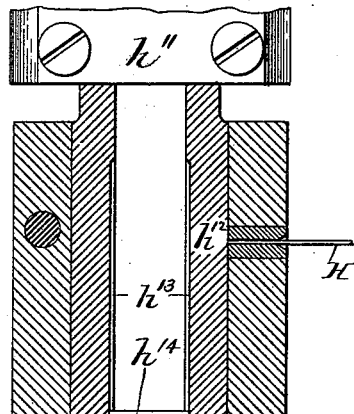
Figure 30:
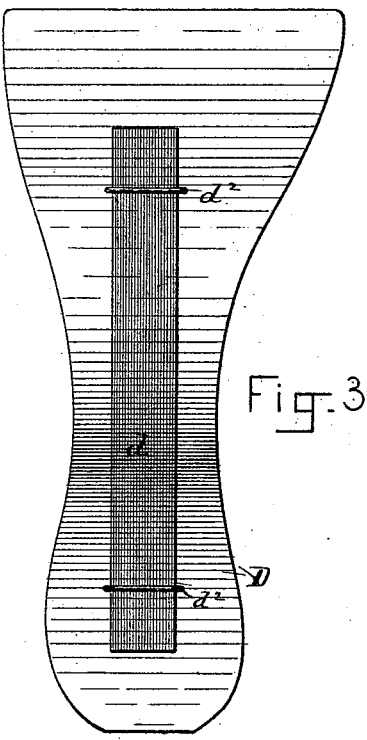
Figure 19:
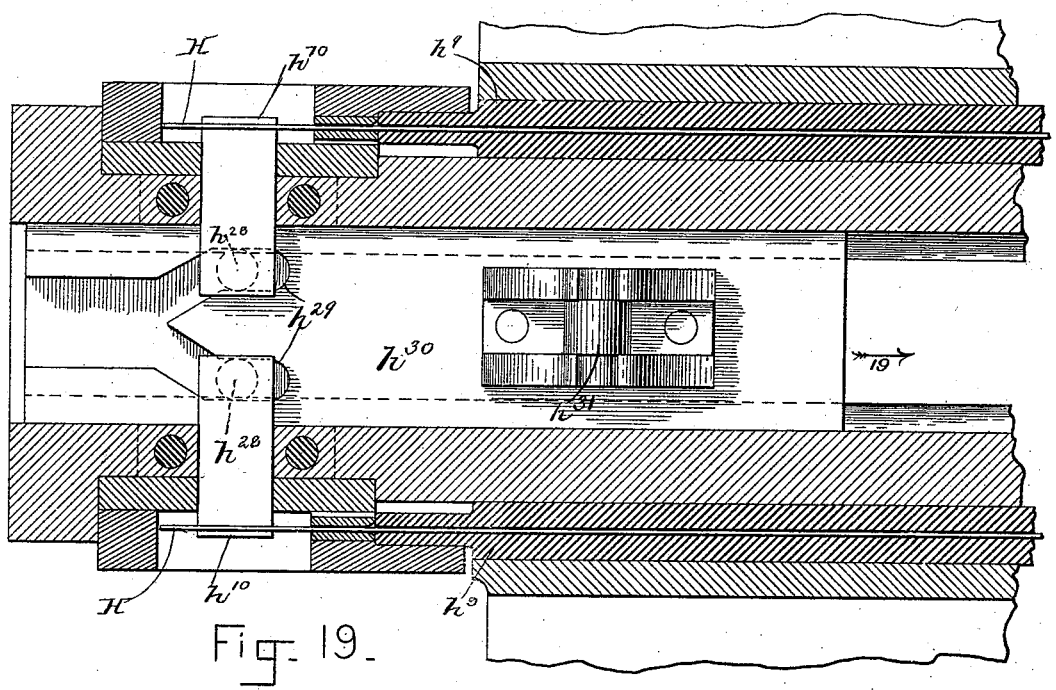
Figure 20:
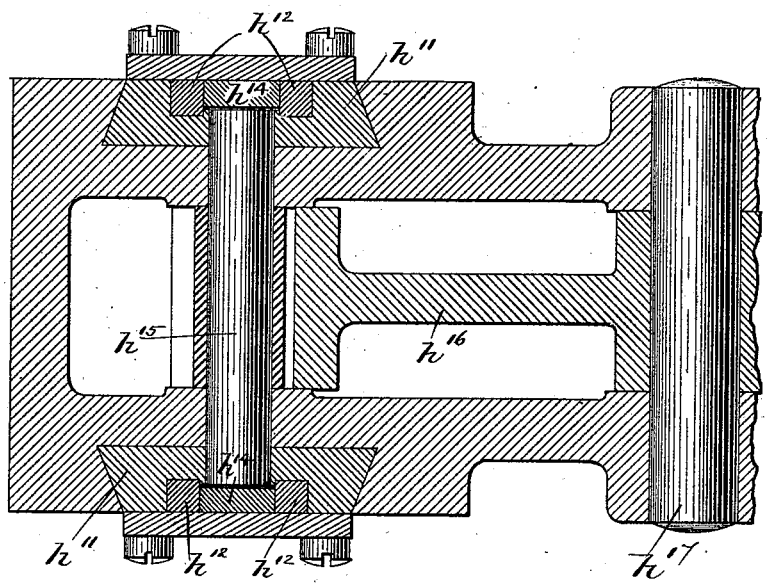
Figure 21:
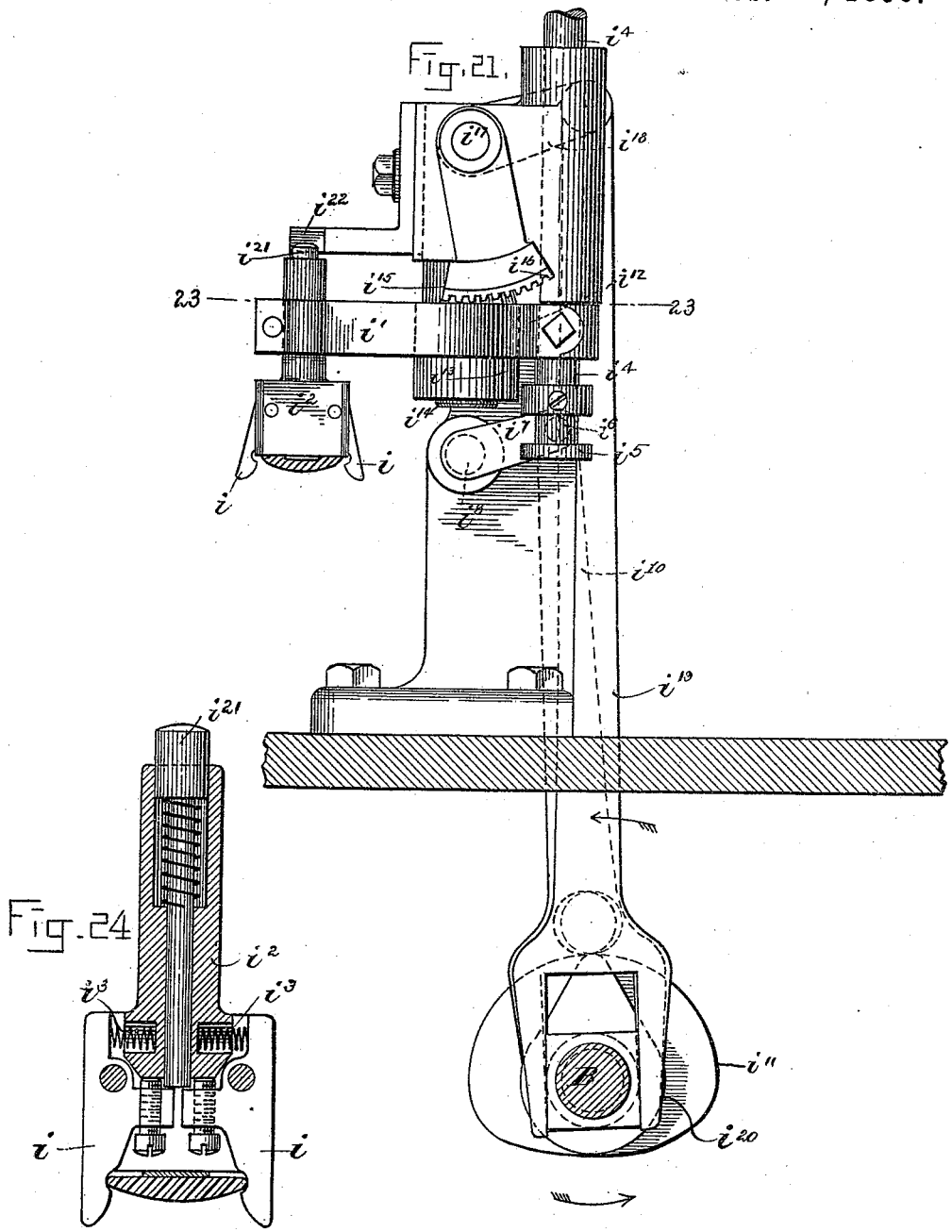
Figure 22:
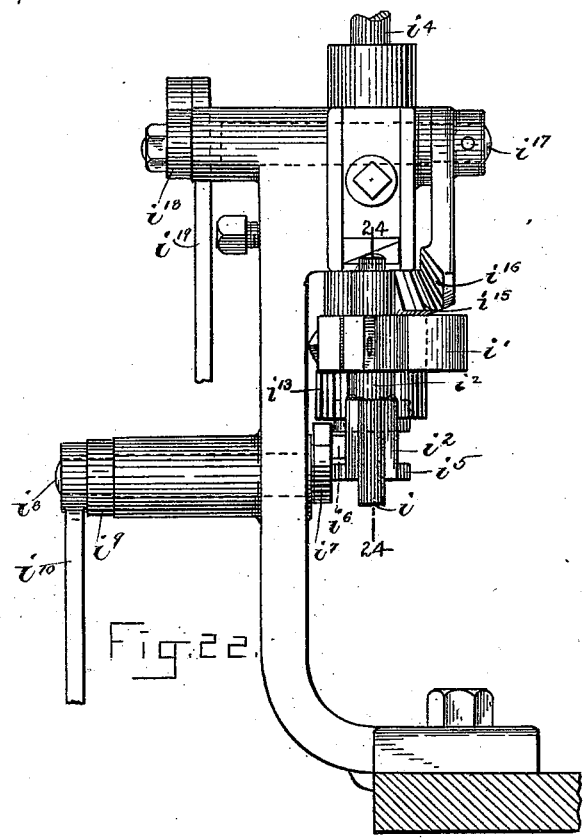
Figure 23:
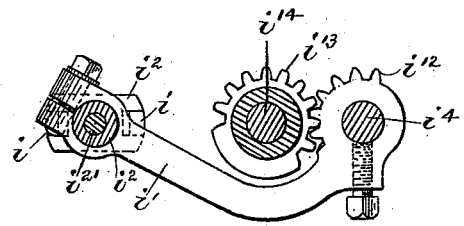

Fig. 1 of the drawings is a plan view of my improved shoe-shank machine. Fig. 2 is a front elevation of the same. Fig. 3 is a side elevation of the same, as viewed from the right of Fig. 1. Fig. 4 is a vertical longitudinal section on line 4 4, Fig. 1. Fig. 5 is a horizontal section on line 5 5, Fig. 4. Fig. 6 is an enlarged sectional elevation on line 4 4, Fig. 1, illustrating the mechanism for transferring the steel reinforcing-strip from the stack of the strips to the surface of the leather-board shank preparatory to being attached thereto by the wire staples, as will be hereinafter explained. Figs. 7, 8, 9, 10, and 11 are detail views illustrating the different positions of the various pieces for handling the steel strip as it is being carried down from the steel-strip carrier-slide to the surface of the leather-board shank. Fig. 12 is a plan view of the mechanism for carrying the steel strip down from the carrier-slide to the leather-board shank. Fig. 13 is a vertical sectional elevation through the center of the disk-rotating mechanism, line 13 13, Fig. 5, the crank being shown in a position at right angles to the cam-shaft. Fig. 14 is a vertical longitudinal section on line 14 14, Fig. 1, illustrating the wire feeding, cutting, bending, and driving mechanism. Fig. 15 is a similar view taken on line 4 4, Fig. 1, illustrating still further the wire feeding, cutting, bending, and driving mechanism. Figs. 16, 17, and 18 illustrate the different positions assumed by the various pieces in cutting and bending the wire and driving the same into the shank. Fig. 19 is a horizontal sectional plan on line 19 19, Fig. 14, illustrating the mechanism for operating the anvils upon which the staples are bent. Fig. 20 is a horizontal section on line 20 20, Fig. 15. Fig. 21 is a front elevation of the mechanism for running the completed shank from the machine. Fig. 22 is a side elevation of the same as viewed from the left of Fig. 21. Fig. 23 is a detail horizontal section on line 23 23, Fig. 21. Fig. 24 is a vertical section of the picker-fingers, taken on line 24 24, Fig. 22. Fig. 25 is a sectional elevation, line 25 25 of Fig. 1, illustrating the stack of steel strips and the carrier-slide for removing them one by one. Fig. 26 is a vertical section on line 26 26, Fig. 25. Fig. 27 is a plan view of one of the shank-receptacles removed from the rotating disk. Fig. 28 is a section on line 28 28, Fig. 27. Fig. 29 is a section on line 29 29, Fig. 27. Fig. 30 is a plan view of my improved shoe-shank.

Similar letters refer to similar parts throughout the several views.

The main driving-shaft A is rotated by the pulley $a$, said pulley being connected with the shaft by a clutch $a'$. The clutch $a'$ is thrown into connection by the handle $a^2$, rock-shaft $a^3$, arm $a^4$, and rod $a^5$, and out of connection by the treadle $a^6$, rod $a^7$, lever $a^8$, and rod $a^5$, which are not necessary to describe in detail, as these devices do not form essential features of my invention, and any of the well-known methods of driving the shaft by a clutch mechanism may be used.

The shaft A has bearings at $a^9$ $a^9$ in the frame of the machine. The main shaft is geared by the pinion $a^{10}$ and gear $b$ to the cam-shaft B. The leather-board shank to which the reinforcing-strip of steel is to be attached is first placed by the operator in one of the recesses of the rotating disk C, the disk being provided with a number of recesses $c$ $c$ $c$, which recesses are of substantially the outline of the leather-board shank, as shown in Figs. 1 and 7. The recesses are formed in plates $c'$, which may be detached from the disk C, so that different sizes or styles of shank may be made in the same machine by changing the plates. In each of the plates $c'$ are two anvils $c^2$ $c^2$, provided with cup-shaped concavities, upon which the leather-board shank D rests, as shown in Figs. 28 and 29, and which serve by means of said concavities to turn the points of the staple back into the leather-board shank when they are driven through the same.

The disk C has an intermitted rotation upon a sleeve $c^{11}$ fixed in the frame of the machine. Said rotation is imparted to the disk in the following manner: The disk has upon its under side a hub to which is fastened the plate $c^3$. Said plate $c^3$ is provided with radial slots $c^4$ $c^4$ and with curved recesses $c^5$ $c^5$ in the periphery. (See Figs. 4, 5, and 13.) A crank-plate $c^6$ is given a continuous rotation by means of the shaft $c^7$ and bevel-gear $c^8$, meshing in bevel-gear $c^9$ on the cam-shaft B. Upon the crank-plate $c^6$ is journaled the roll $c^{10}$. Said roll $c^{10}$ moves in the slots $c^4$ $c^4$ and times the disk $c^3$ one-sixth of a rotation as it moves out of engagement with the slotted plate. A portion of the periphery of the crank-plate $c^6$ engages the concave portion $c^5$ of the slotted plate $c^3$ and locks it in position while the staple is being driven in the shank and the completed shank is being removed from the disk C, as hereinafter described.

The steel reinforcing-strips $d'$ $d'$ are placed in a vertically-grooved raceway E, one upon the other, as shown in Figs. 1, 6, 25, and 26. The raceway is provided with two grooves $e'$ $e'$, which guide the steel strips. The lowermost strip is separated from the other strips in the stack by a horizontally-reciprocating slide $e^2$. The slide is guided in ways $e^3$ attached to the raceway E, and is moved forward and backward therein by the connection $e^4$ and crank $e^5$, the crank $e^5$ being fast to the vertically-rotating shaft $e^6$. To the lower end of the shaft $e^6$ is fastened a bevel-gear $e^7$, which meshes into a bevel-gear $e^8$, fast to the shaft $e^9$, to the opposite end of which is fastened the bevel-gear $e^{10}$, meshing into a bevel-gear $e^{11}$ in the cam-shaft B. In the carrier-slide $e^2$ are formed two recesses $e^{12}$ $e^{12}$, one on either side of the same, Fig. 26, into which the ends of the lowermost strip in the raceway drop when the slide has moved to its extreme backward position, as in Fig. 4. As the slide $e^2$ is moved forward in the direction of the arrow, Fig. 6, the lowermost strip of steel $d$ is separated from the other strips $d$ in the stack and carried by it, as shown in Fig. 6, to the vertically-reciprocating mechanism, where it is left by the slide, as hereinafter described, to be carried down and placed upon the surface of the leather-board shank preparatory to being attached thereto by the staples, as hereinafter described.

The steel strip $d$ is carried by the slide $e^2$, Fig. 6, between the spring-finger $f$ and the carrier $f'$ to the position shown in Fig. 7. On each side of the carrier $f'$ are plates $f^2 f^2$, Figs. 7 and 12, said plates being provided with a recess $f^3$, formed to embrace the ends of the steel strip $d$ and hold it in position while it is being carried downwardly to the shank D. As soon as the slide $e^2$ has carried the strip $d$ to the position shown in Fig. 7 the carrier $f'$ is lowered to the position shown in Fig. 8, as hereinafter described, the strip $d$ entering the recesses $f^3$. The spring-finger is then moved in the direction indicated by the arrow 1, Fig. 8, as hereinafter described, and slipping off the pin $f^4$ assumes the position shown in Fig. 9, the spring-finger snapping up and catching the strip $d$ in the center between the plates $f^2 f^2$, thus holding it securely in position. The slide $e^2$ now retreats in the direction of the arrow 2, Fig. 8, and the carrier $f'$ descends, carrying the shank $d$ to the position shown in Fig. 10 upon the surface of the leather-board shank D. The staples are then driven into the shank, attaching the steel strip to the shank, and the spring-finger $f$ is moved in the direction of the arrow, Fig. 10, drawing it out from between the steel strip $d$ and the shank D, as shown in Fig. 11. The carrier and spring-finger then return to the position shown in Fig. 7, ready to receive another strip. The carrier $f'$ is fastened to a vertically-reciprocating rod $f^5$. Said rod slides lengthwise in bearings $f^6 f^6$ and is prevented from turning by a projection thereupon which slides in a slot in the frame. (Not shown.) A pin $f^7$ fast to the rod $f^5$ engages the slotted arm $f^8$. Said arm $f^8$ is attached to the rock-shaft $f^9$, said rock-shaft being rocked in its bearings in the frame by the cam-lever $f^{10}$ and cam $f^{18}$ in the cam-shaft B.

The spring-finger $f$ is attached to the sliding block $f^{12}$. The sliding block $f^{12}$ slides upon a dovetail formed upon the carrier $f'$ and is reciprocated by means of the pin $f^{13}$, which engages the slotted arm $f^{14}$, said arm being fast to the rock-shaft $f^{15}$, to which a rocking motion is imparted by the cam $f^{18}$ through the connection $f^{17}$ and rocker-arm $f^{16}$.

Having now described the mechanism for carrying the steel strip forward from the stack of strips to the vertically-reciprocating carrier, and by said carrier placing the steel strip upon the leather-board shank as it rests in one of the recesses upon the rotating disk, ready to be attached thereto by the two wire staples, I will now proceed to describe the mechanism for feeding the wire into the machine in two strips, cutting said strips up into the proper lengths, bending said lengths so as to form staples, carrying the staples down and placing them each astride of the steel strip, at the proper place, and then driving said staples into the leather-board and clinching the ends of the staples in the leather-board.

The wire H from which the staples for securing the steel strips to the shank are formed is fed into the machine from two reels by the feed-rolls $h\ h$. Said rolls are fast to shafts $h'\ h'$, being intermittently rotated by the gears $h^2\ h^2\ h^2$. The lowest gear $h^2$, Figs. 2, 3, and 15, is intermittently rotated by means of the ratchet $h^3$ fast to shaft $h^4$, pawl $h^5$, connection $h^6$, and crank-pin $h^7$, adjustably attached to crank-plate $h^8$, said plate being fast to the main shaft B.

The wire H is fed in the manner described through guides $h^9$, Figs. 14 and 19, across the upper face of the anvil-blocks $h^{10}\ h^{10}$ to the position shown in Fig. 14, two vertically-reciprocating slides $h^{11}\ h^{11}$, each carrying two slender bars $h^{12}\ h^{12}$, Figs. 14, 16, and 18, then moving downwardly from the position shown in Fig. 14 to that shown in Fig. 16, cutting off the wire from the main strips and bending it over the anvil-blocks $h^{10}\ h^{10}$. The anvil-blocks are then drawn toward each other, Fig. 19, leaving the staples suspended in grooves in the benders $h^{12}$. The benders then descend to the position shown in Fig. 17, the staples being placed astride the steel strip ready to be driven. Two vertically-reciprocating drivers $h^{14}$ now descend and drive the staples into the shank, Fig. 18.

The benders $h^{12} h^{12}$ are strips of steel grooved in the inner faces at $h^{13}$ to receive and hold the staples. The benders $h^{12}$ are gripped to vertically-reciprocating slides $h^{14}$, guided in ways in the frame, and connected by a pin $h^{15}$, engaging the slotted rock-lever $h^{16}$, which rock-lever is fast to the rock-shaft $h^{17}$, and the rock-shaft is rocked in its bearings in the frame by the arm $h^{18}$, connection $h^{19}$ and cam $h^{20}$.

The drivers $h^{14}$ are attached to vertically-reciprocating slides $h^{21}$, said slides being guided in ways in the frame and connected by a pin $h^{22}$, said pin engaging the slotted rock-lever $h^{23}$, said rock-lever being fast to the rock-shaft $h^{24}$, said rock-shaft being rocked in its bearings in the frame by the arm $h^{25}$, connection $h^{26}$, and cam $h^{27}$.

After the wire has been bent in the form of a staple, as in Fig. 17, it is necessary that the anvil-blocks $h^{10}$ should be drawn back in order that the staples may be carried down upon the shank and driven therein. In order to accomplish this I have provided upon the anvil-blocks $h^{10}\ h^{10}$ cam-rolls $h^{28}\ h^{28}$, which enter into the cam-paths $h^{29}\ h^{29}$, formed in the reciprocating slide $h^{30}$. The slide $h^{30}$ is moved backward and forward by a pin $h^{31}$ in the rocker-arm $h^{16}$, so that as the benders descend it is evident that the slide $h^{30}$ will be moved in the direction of the arrow, Fig 19, and the cam-grooves $h^{29}$ will draw the anvil-blocks $h^{10}$ toward each other and away from the staples which have been formed upon them by the benders $h^{12}$.

Having now attached the steel strip to the leather-board shank, it will next be necessary to remove the completed shank from the machine. The shank, after having the strip attached to it by staples, is moved one-sixth of a rotation of the disk C to the position shown in Fig. 1 marked I. A pair of spring-fingers $i'$ $i'$ are then lowered and sprung over the edges of the shank at its central portion, Fig. 24. The fingers are then raised, carrying the shank with them. The fingers are next swung around on the arm $i$ from the position shown in Fig. 1 to that shown in Fig. 23, when the fingers are opened, as hereinafter described, and the shank dropped into a receptacle provided therefor.

The spring-fingers $i'$ $i'$ are pivoted to the carrier-block $i^2$. Said fingers are kept pressed toward each other at the lower ends by the springs $i^3$ $i^3$. The carrier-block $i^2$ is fastened to the arm $i$, said arm being fast to the vertical shaft $i^4$, which is given a vertically-reciprocating motion by means of the grooved collars $i^5$, in the groove of which there plays a roll $i^6$ upon an arm $i^7$, said arm $i^7$ being fast to the rock-shaft $i^8$, which is rocked in its bearings in the frame by the rocker-arm $i^9$, connection $i^{10}$, and cam $i^{11}$ on the cam-shaft B. By this train of mechanism it is evident that a vertical reciprocating motion may be given to the spring-fingers $i'$ $i'$. In order to swing the fingers $i'$ from the position shown in Fig. 1 to that shown in Fig. 23, I provide upon the arm $i'$ a segmental gear $i^{12}$. Said segmental gear meshes with the segmental gear $i^{13}$, which turns loose upon the stud $i^{14}$ in the frame. To the gear $i^{13}$ is attached the segmental bevel-gear $i^{15}$, which meshes with the segmental bevel-gear $i^{16}$, fast to the rock-shaft $i^{17}$. This rock-shaft is rocked in its bearings in the machine by means of the rocker-arm $i^{18}$, connection $i^{19}$, and cam $i^{20}$, fast to the shaft.

After the picker-fingers have been lowered and sprung over the sides of the shank, they are then raised, picking up the shank from the disk C, and are then swung around to the position shown in Figs. 21, 22 and 23, when the spring-plug $i^{21}$ strikes the incline $i^{22}$ fast on the frame of the machine, forcing the plug $i^{21}$ down, and thus opening the spring-fingers, as in Fig. 21, and allowing the shank to drop into the receptacle provided.

The operation of my improved shoe-shank machine as a whole is as follows: The clutch having been thrown into connection with the driving-pulley by means of the hand-lever, the operator places a leather-board shoe-shank in each of the receptacles on the intermittently-rotated disk as it rotates. The lowermost steel strip in the stack is then carried by the horizontally-reciprocating slide $e^2$ to the vertically-reciprocating carrier $f'$, by which it is seized and carried downwardly upon the surface of the leather-board shank, preparatory to being attached thereto by the staples. The wire is fed into the machine in two separate lengths, cut off in sections of the proper length, bent into the form of a staple, carried down to the surface of the shoe-shank and driven therein astride the steel reinforcing-strip. The disk C then turns one-sixth of a rotation, carrying with it the completed shank. The picker-fingers then descend, embrace the shank, rise with it, swing around over the receptacle, open and drop the shank therein, all as previously herein described.

A suitable enumerating or counting device for keeping a record of the product of the machine is to be attached.

Having thus described my invention, what I claim, and desire to secure by Letters Patent, is—

1. In a machine for attaching a stiffening-piece to a shoe-shank, a horizontally-revolving dial-plate, adapted to receive the shoe-shanks, a suitable receptacle for the stiffening-pieces mounted on the frame above the dial-plate, and means, substantially as shown, for removing the stiffening-pieces successively from said receptacle, combined with means, substantially as shown, for advancing them successively upon the shoe-shanks and holding them in proper position, and means for fastening the stiffening-pieces to the shoe-shanks, substantially as described.

2. In a machine for attaching a stiffening-piece to a shoe-shank, a horizontally-revolving dial-plate, adapted to receive the shoe-shanks, a receptacle for the stiffening-pieces mounted upon the frame, and under which one edge of the dial-plate revolves, a reciprocating slide for removing the pieces successively from the receptacle, a partially-revolving carrier for receiving the pieces and depositing them upon the shanks, and means, substantially as shown, for securing the stiffening-pieces to the shanks, all combined substantially as described.

3. In a machine of the nature described the slide $h^{30}$ provided with the grooves $h^{29}$, and the anvils, provided with projections to catch in the grooves, combined with the angular lever connected at its lower end to the slide, the two rods $h^{12}$, grooved upon their inner sides for cutting off, bending and holding the wires, and which are also operated by the angular lever; and means for feeding the wires, substantially as set forth.

4. In a machine for attaching a stiffening-piece to a shoe-shank, a revolving dial-plate provided with recesses to receive the shanks, and two anvils in each recess, substantially as specified.

5. In a machine of the nature described the grooved slide $h^{30}$, the anvils having a reciprocating movement and operated by the slide, a wire-feeding mechanism, a rocking lever for operating the slide, and two grooved vertically-moving rods, for cutting off, bending, and holding the wires, and which are also operated by the rocking lever, combined with the vibrating lever, two drivers operated by this vibrating lever and located between the grooved rods, and mechanism for operating the two levers, substantially as shown.

6. A shaft having a crank secured to its upper end, a reciprocating slide operated by the crank, a dial-plate provided with recesses to receive the shoe-shanks, a sleeve placed on the shaft, and a radially-slotted plate having recesses in its edge, combined with a continuously-revolving cam-plate, provided with an arm, having a projection on its end to enter the radial slots, and a receptacle for holding the stiffening-pieces; the dial and radially-slotted plates being placed upon the sleeve and having an intermittent rotary motion, while the shaft and the cam have a continuous one, substantially as described.

7. In a machine for attaching a stiffening-piece to a shoe-shank, a receptacle for holding the pieces, a continuously-reciprocating slide for removing the pieces successively from the receptacle and a partially-revolving carrier for receiving the pieces, as they are removed from the receptacle, and depositing them upon the shoe-shanks, combined with an intermittingly-revolving dial-plate, having recesses to receive the shanks, a radially-slotted plate provided with recesses in its edge, a continuously-revolving cam-plate provided with an arm having a projection on its end to enter the radial slots, and which cam-plate causes the dial and radially-slotted plates to partially revolve, and then locks them in place for a predetermined length of time, wire-feeding and staple-forming cutting mechanisms, and a mechanism, substantially as described, for forcing the wires through the shanks, and securing the stiffening-pieces to the shanks.

8. In a machine of the character described, a carrier device consisting of a partially-revolving shaft, a mechanism for so revolving the shaft and giving it a rising-and-falling movement, and an arm combined with the shaft, and a spring-holding finger having an endwise movement in relation to the arm, substantially as described.

9. A carrier composed of a partially-revolving shaft, which has a rising-and-falling movement, and a mechanism for operating it, combined with an endwise-moving elastic finger, a stationary arm secured to the shaft and upon which the finger moves, means for giving the finger its endwise movement at predetermined times, and an endwise-moving slide which presents the stiffening-piece to the carrier to be deposited upon the shank, substantially as set forth.

10. A carrier composed of a partially-revolving shaft which has a rising-and-falling movement, and a mechanism for operating it; an arm secured to the upper end of the shaft, and which has a recess in its inner end, and a projection secured to, or formed upon the under side of the arm in the line of travel of the finger, combined with an elastic finger, having an endwise movement upon the arm, a mechanism for moving the finger, and a slide which presents the articles to the carrier, substantially as specified.

11. An intermittent feed mechanism for the wires, movable anvils over which the wires are passed, and vertically-moving rods which descend upon opposite sides of the anvils, and are grooved upon their inner sides, combined with endwise-moving anvils, provided with projections upon their inner ends, and endwise-moving slides provided with suitably-shaped grooves, whereby the anvils are withdrawn from under the wires after they have been cut off by the vertically-moving rods and formed into staples, substantially as described.

12. An intermittent feed mechanism for the wires, slides $h^{11}$, having secured to them the rods $h^{12}$, crank-levers for operating both the said slides and the anvils, and a mechanism for intermittently operating the crank-levers, combined with vertically-moving rods, for cutting off and bending the wires, the endwise-moving anvils, and grooved slides to which both the anvils and the crank-levers are connected, substantially as set forth.

13. An intermittent feed mechanism for the wires, endwise-moving anvils over which the ends of the wires are passed, endwise-moving grooved slides to which the inner ends of the anvils are loosely connected, crank-shafts attached to the slides, and mechanism for rocking the crank-shafts, combined with vertically-moving slides carrying rods in pairs for cutting off and bending the wires into staples, and then carrying the staples down into position to be driven, vertically-reciprocating drivers, which move between the rods which bend and hold the wire staples, means for operating the drivers, and the revolving dial-plate which presents the article into which the staples are to be driven, substantially as specified.

14. A revolving dial-plate provided with recesses to receive the shanks and stiffening-pieces, means for grasping and holding in position these parts, and a driving mechanism for driving staples through the shanks, combined with a means for forming the staples and delivering them to the drivers, and means for removing the shanks from the dial-plate after they have been fastened to the stiffening devices, substantially as shown.

15. A revolving dial-plate provided with recesses to receive the shanks and stiffening-pieces, combined with spring-fingers which have a vertical and then a swinging movement, means for operating the fingers and a means for opening the fingers to discharge the shanks, substantially as described.

16. The spring-actuated fingers, the carrier-block in which the fingers are mounted, the arm to which the block is secured, and the shaft carrying the arm, the shaft having a vertically-reciprocating movement, combined with a suitable mechanism for operating the shaft, substantially as set forth.

17. A vertically-reciprocating shaft, a mechanism for reciprocating it, and a mechanism for causing the shaft to revolve, combined with an arm secured to the shaft and having a swinging movement, a carrier-block carried by the arm, pivoted spring-actuated fingers mounted in the block, an endwise-moving spring-actuated rod which passes down through the block, and means for depressing the rod so as to cause it to open the fingers when the end of the swinging movement of the arm is reached, substantially as specified.

18. The rocking shaft $i^{17}$, a mechanism for rocking it, the segmental toothed arm connected to one end, and a pinion operated by the arm, combined with the carrier-arm, having teeth on its end to engage with the pinion and the spring-actuated fingers on the end of the arm substantially as shown.

19. The sectional plates $c'$ provided with the recesses to receive the shanks, combined with an anvil at each end of the recess and means for securing the anvils in place, substantially as described.

20. The partially-revolving vertically-reciprocating shaft $f^5$, the arm secured to its upper end, and means for operating them, combined with the slide, placed on one end of the arm, means for moving the slide endwise, the spring-finger secured at one end to the slide, means secured to the arm for opening the end of the finger when forced forward and the slide for delivering the article to the carrier substantially as set forth.

ANDREW C. CAMPBELL.

Witnesses:
MARTIN H. BRENNAN,
TESSIE ENRIGHT.